May 12, 1925.  1,537,596

C. FLOYD

FRUIT POLISHING MACHINE

Filed Oct. 4, 1922

INVENTOR—
CAROL FLOYD.
BY
ATTORNEY—

Patented May 12, 1925.

1,537,596

UNITED STATES PATENT OFFICE.

CAROL FLOYD, OF ORLANDO, FLORIDA.

FRUIT-POLISHING MACHINE.

Application filed October 4, 1922. Serial No. 592,271.

*To all whom it may concern:*

Be it known that I, CAROL FLOYD, a citizen of the United States, and resident of Orlando, in the county of Orange and State of Florida, have invented certain new and useful Improvements in Fruit-Polishing Machines, of which the following is a specification.

This invention relates to machines for brushing and cleaning fruit or vegetables, and has for its object the provision of a machine which will treat the articles in a manner to not only clean and polish the same but to also, at the same time, apply a coating which prolongs the edible quality of the fruit or vegetables. Since the machine is particularly adapted to the treatment of citrus fruits, the term oranges will be hereinafter generally used for the sake of brevity and not of limitation, to denote the articles treated.

Several types of machines are now employed for the cleaning of oranges, the most popular ones having one or more rotary brushes along which the oranges travel during the cleaning operation. My invention consists in the provision of means for applying material such as paraffine to the brush or brushes employed in such machines, which material is then transferred by brush or brushes to the surfaces of the oranges.

As my invention is not limited to any particular type of fruit brushing machine, nor to any particular material of which the brushes are made, I shall not attempt to illustrate or describe more than is actually necessary to render the invention clear to those familiar with fruit polishing machines.

Of the accompanying drawings:—

Similar reference characters designate similar parts in both of the views.

Figure 1:
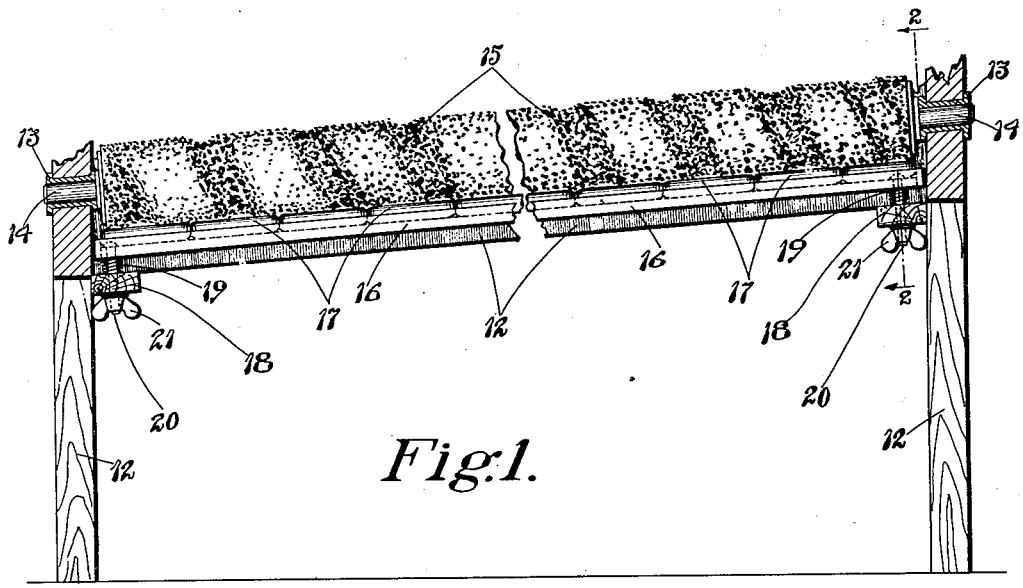
Figure 1 is a side elevation, partly in section, of a fruit polishing machine having my invention applied thereto.
Figure 2:
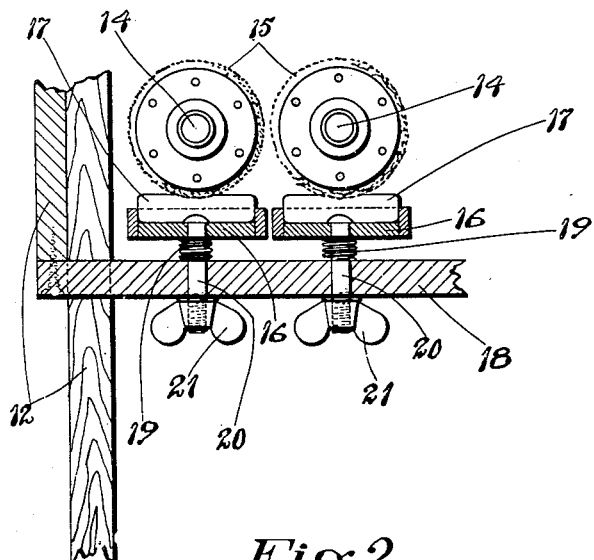
Figure 2 represents an end view, partly in section on the line 2—2 of Figure 1, on a larger scale.

Portions of the frame of the machine are indicated at 12, said frame being provided with bearings 13 for the ends of the shafts 14 of the rotary brushes 15. The machine as so far described is or may be of any well known or preferred type.

Below each brush and parallel therewith is a trough 16 for holding the polishing material 17, preferably paraffine which, as indicated, is most conveniently supplied in the form of blocks or cakes.

Each trough 16 is yieldingly supported so that as the material 17 is worn away by the brush above it, a constant supply of the material will be provided to enable the brush to transfer it to the fruit being acted upon by the upper portions of the brush. To provide said support there are two transverse bars 18 suitably connected to the frame of the machine. Confined between the bars 18 and the bottoms of the troughs 16 are springs 19 coiled around bolts 20 which extend down through the bars and are provided with wing nuts 21 on their lower ends. Said nuts enable the troughs to be adjusted relatively to the brushes, the springs permitting the troughs to yield as the brushes revolve.

In operation, assuming that paraffine or similar material is in the troughs as indicated in the drawings, and that the nuts 21 have been adjusted so that said material is in contact with each brush throughout its entire length and that the springs are under some degree of compression, the friction caused by the revolution of the brush in contact with the said material generates sufficient warmth to soften the material and cause it to be taken up by the brush and by the latter transferred to the surfaces of the oranges which are travelling along the brushes on their upper portions. The springs ensure a yielding pressure of the paraffine against the brush until such time as the wearing away of the paraffine by the brush necessitates a new adjustment of the trough, at which time the nuts 21 will be turned in the proper direction and to the proper extent to cause the springs 19 to elevate the trough to a new level. In other words, the wear of the paraffine can be readily taken up by the adjusting nuts 21. Loosening of the nuts causes the springs 19 to automatically push the trough and its contents toward the brush so that the proper amount of the paraffine or equivalent will be taken up by the brush. The nuts 21 serve the purpose of stops to prevent excessive application of the material to the brush in case said material is quite soft due to becoming too warm, or due to any other reason.

During the rotation of the brush it acquires a light coating of the paraffine which is then transferred to the oranges so that the latter are not only polished by the brush but also, at the same time, receive a coating which helps to preserve them.

Having now described my invention, I claim:—

1. A fruit polishing machine having a brush for acting on the fruit, and means for supporting blocks of paraffine in position to directly contact with the brush to be transferred to the fruit by said brush.

2. The combination with a rotary fruit polishing brush, of a yieldingly supported holder for maintaining a fruit-coating material in contact with the brush.

3. The combination with a rotary fruit polishing brush, of a yieldingly supported holder for a supply of paraffine in position for the brush to contact with the paraffine.

4. The combination with a rotary fruit polishing brush, of a yieldingly supported trough having means for supporting cakes of paraffine in position to contact with the brush.

5. In a machine for polishing fruit, a rotary brush, and means for applying paraffine to said brush, said means comprising a yieldingly supported trough below the brush and parallel therewith.

In testimony whereof I have affixed my signature, in presence of two witnesses.

CAROL FLOYD.

Witnesses:
W. M. TARPLEY,
W. E. LAND.